US012615156B2

(12) United States Patent　　(10) Patent No.: US 12,615,156 B2

Argulkar et al.　　(45) Date of Patent: Apr. 28, 2026

(54) DEVICE LINKED SESSION

(71) Applicant: Wells Fargo Bank, N.A., San Francisco, CA (US)

(72) Inventors: Navin Argulkar, San Jose, CA (US); Upul D. Hanwella, San Francisco, CA (US); Chintan Mehta, San Ramon, CA (US); Anil K. Mishra, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 202 days.

(21) Appl. No.: 18/506,028

(22) Filed: Nov. 9, 2023

(65) Prior Publication Data

US 2025/0158829 A1　　May 15, 2025

(51) Int. Cl.
　H04L 9/32　　(2006.01)
　H04L 9/14　　(2006.01)
(52) U.S. Cl.
　CPC .............. H04L 9/3247 (2013.01); H04L 9/14 (2013.01)
(58) Field of Classification Search
　CPC ................................ H04L 9/3247; H04L 9/14
　See application file for complete search history.

(56) References Cited

U.S. PATENT DOCUMENTS

| | | | |
|---|---|---|---|
| 11,057,393 B2 | 7/2021 | Coffing | |
| 11,155,239 B2 | 10/2021 | Zhang et al. | |
| 11,411,944 B2 | 8/2022 | Abdul et al. | |
| 11,683,177 B2 | 6/2023 | Hamel et al. | |
| 2011/0099367 A1* | 4/2011 | Thom | H04L 9/3247 |
| | | | 713/181 |
| 2018/0060496 A1* | 3/2018 | Bulleit | H04L 9/0643 |
| 2018/0167397 A1 | 6/2018 | Zhang | |
| 2020/0236113 A1 | 7/2020 | Monica et al. | |
| 2021/0288968 A1* | 9/2021 | Legault | H04L 63/0861 |
| 2022/0294643 A1 | 9/2022 | Wang et al. | |
| 2022/0321356 A1 | 10/2022 | Wang et al. | |
| 2022/0417034 A1* | 12/2022 | Wang | H04L 63/0823 |

FOREIGN PATENT DOCUMENTS

| | | |
|---|---|---|
| EP | 3422630 | 2/2021 |
| WO | 2018202284 | 11/2018 |

OTHER PUBLICATIONS

Bairwa, Amit Kumar, "Mutual authentication of nodes using session token with fingerprint and MAC address validation", Egyptian Informatics Journal 22.4 (2021) https: doi.org 10.1016 j.eij.2021. 03.003 pp. 479-491, (Apr. 24, 2021), 13 pages.

Gommans, Leon, "Token-based authorization of Connection Oriented Network resources", GRIDNETS conference proceedings. 2004., (2004), 8 pages.

(Continued)

*Primary Examiner* — Henry Tsang

(74) *Attorney, Agent, or Firm* — SCHWEGMAN LUNDBERG & WOESSNER, P.A.

(57)　　　　　ABSTRACT

A device linked session connects the entity, whether device, application, or other, to a request for a session token. In subsequent uses of the token, the device identity is checked to avoid a token being used by an entity that did not request the token.

16 Claims, 6 Drawing Sheets

(56) References Cited

OTHER PUBLICATIONS

Marforio, Claudio, "Smartphones as Practical and Secure Location Verification Tokens for Payments", In NDSS vol. 14, https: ethz.ch content dam ethz special-interest infk inst-infsec system-security-group-dam research publications pub2014 ndss_marforio.pdf, (Feb. 22, 2014), 16 pages.

Nauman, Mohammad, "POAuth: privacy-aware open authorization for native apps on smartphone platforms", Proceedings of the 6th International Conference on Ubiquitous Information Management and Communication. 2012, (Feb. 2012), 8 pages.

Zhang, Z, "El Passo: Efficient and Lightweight Privacy-preserving Single Sign On", Proceedings on Privacy Enhancing Technologies, 2021(2), pp. 70-87. doi: 10.2478 popets-2021-0018, (2021), 20 pages.

* cited by examiner

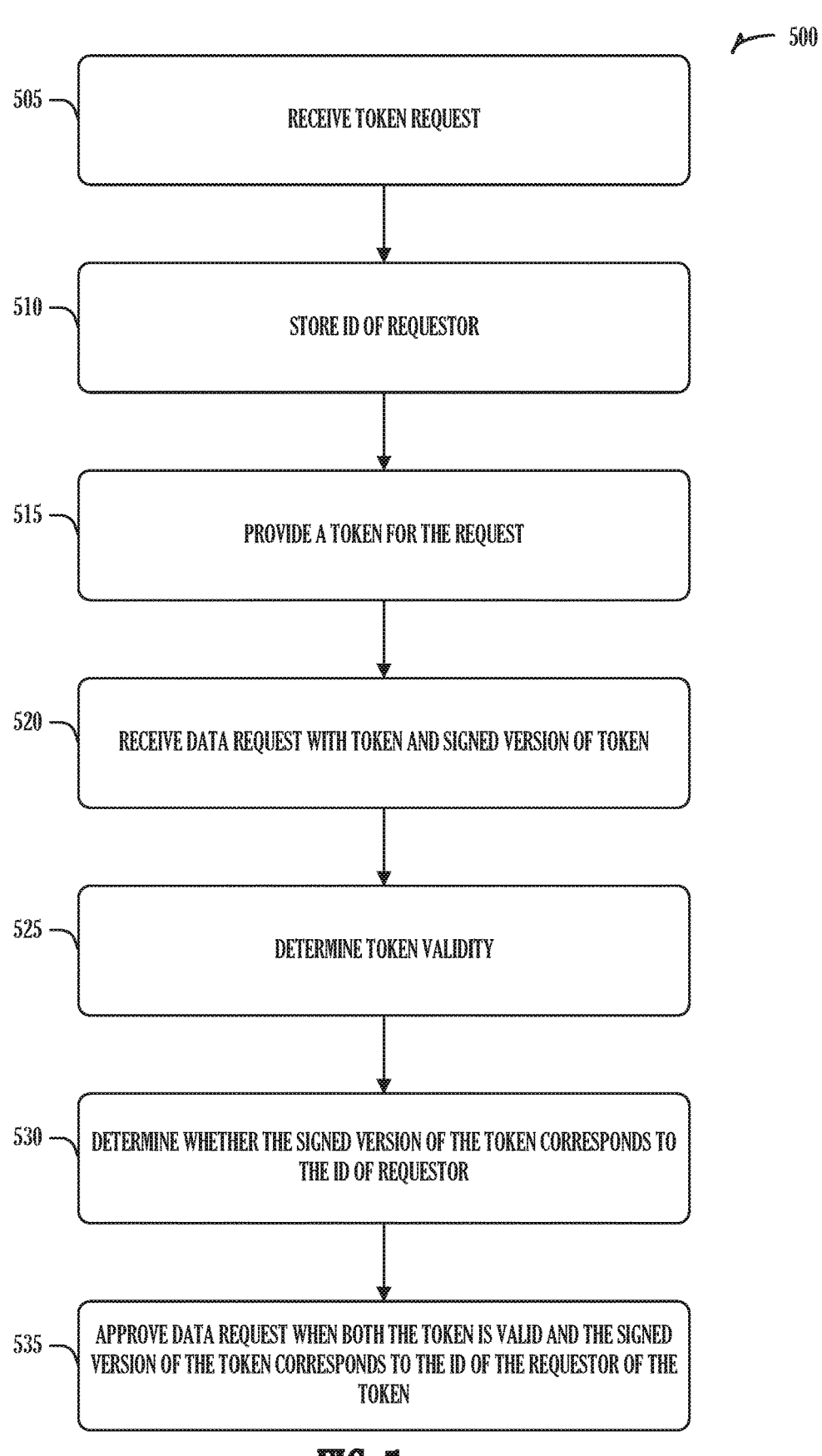

505 — RECEIVE TOKEN REQUEST

510 — STORE ID OF REQUESTOR

515 — PROVIDE A TOKEN FOR THE REQUEST

520 — RECEIVE DATA REQUEST WITH TOKEN AND SIGNED VERSION OF TOKEN

525 — DETERMINE TOKEN VALIDITY

530 — DETERMINE WHETHER THE SIGNED VERSION OF THE TOKEN CORRESPONDS TO THE ID OF REQUESTOR

535 — APPROVE DATA REQUEST WHEN BOTH THE TOKEN IS VALID AND THE SIGNED VERSION OF THE TOKEN CORRESPONDS TO THE ID OF THE REQUESTOR OF THE TOKEN

FIG. 5

DEVICE LINKED SESSION

TECHNICAL FIELD

Embodiments described herein generally relate to computer network authentication and more specifically to a device linked session.

BACKGROUND

Computer network authentication helps to ensure the security and integrity of network interactions or data exchanges. In general, an accessor (e.g., client computer) provides credentials (e.g., a username and password, biometric data, etc.) to a verifier (e.g., a server) to access some data or service. The verifier checks the credentials provided with recorded credentials to ensure that the accessor has rights to access the data or service. The procedure is analogous to a gatekeeper, allowing only authorized users to access certain networks or information, protecting against unauthorized access or malicious activities, such as hacking or data theft.

Stateless computer networking is a communication methodology where each transaction between computers (e.g., nodes) is treated as an isolated event, independent of any previous or future transactions. In this model, the server does not retain session information, meaning that the server does not store any data about the client's transaction history. Every request from a client is processed without reference to prior interactions. This approach can enhance scalability and performance, because session data is not maintained (e.g., tracked). Hyper Text Transfer Protocol (HTTP), underlying most web-based communication technologies, is a stateless protocol.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates a flow diagram of an example of a method for device linked session, according to an embodiment.

DETAILED DESCRIPTION

Figure 1:
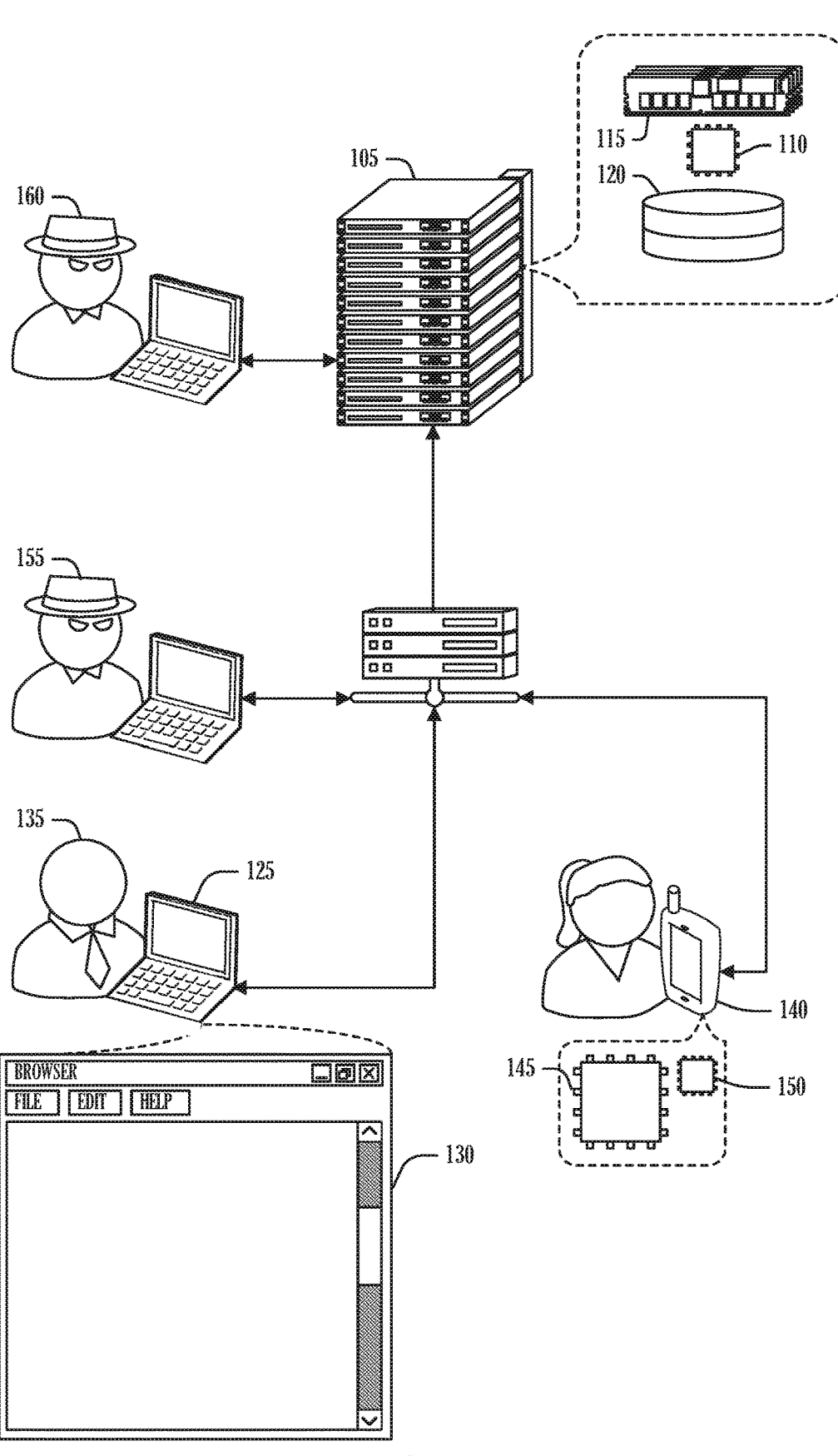
FIG. 1 is a block diagram of an example of an environment including a system for device linked session, according to an embodiment.

Web authentication generally runs on the stateless HTTP. Accordingly, a mechanism is needed to either authenticate a user for each request or to track an initial authentication across stateless requests. The first approach is generally untenable because it would result in the user entering credentials for every image and page being accessed. Thus, the second approach is usually taken. Here, unique tokens are used across requests to demonstrate the success of a previous authentication. For example, when a user authenticates with credentials (e.g., a username and password), the server validates the credentials and, if they are valid, generates a unique token. This token is a digital pass, representing the fact that the user has authentication. In an example, the token also provides or indicates the permissions associated with that authentication. The token is provided to the user, and, for subsequent requests, the token is used to access protected resources by traveling in the header of the HTTP request, enabling the server to identify and authorize the user. This technique can include an additional layer of security by expiring the token after a certain period of time, requiring the user to re-authenticate. This not only verifies that a different person at the same device cannot continue using a user's previous authentication but can also prevent the token from being copied and used at different computers.

Web authentication using tokens does have an issue when access to the token is available before the token expires. Because of the stateless nature of HTTP, session state—or a session identifier that can be used to lookup session state at each end of a communication—is transmitted with each request, usually in the HTTP header. Thus, intercepting a request can lead to the discovery of the token and the use of the token by a malicious actor. To combat this scenario, HTTP communications are often conducted over encrypted channels, such as HTTP Secure (HTTPS). This presents most third parties from discovering the contents of the communications and thus prevents these parties from acquiring the valid token. However, there are scenarios in which the encrypted communication is insufficient to protect the integrity of a valid token. For example, consider a system in which the authenticating service logs the HTTP requests. Here, the token will be identified in the HTTP headers of the logs. If, for example, a malicious employee had access to such logs, the employee could exploit valid tokens. In another example, more and more employers and governments may require encrypted traffic to be unencrypted upon entry to a network in order to scan for malicious software. Here, again, a bad actor has an opportunity to intercept a valid token and use it to execute requests as if the user and authorized these requests.

To address the issues noted above, a device linked session can be used. Here, session refers to the period of validity of a token. When a user authenticates, the application of the device communicating with the authentication service provides an identifier. The identifier can be used to produce a cryptographic public key pair, or the identifier can be used to uniquely identify the application or device, such as a public key. Subsequent communications, by the user, include both the token and a cryptographically signed version of the token. The authentication service can then use the identifier provided during the authentication to verify that the same entity that authenticated is making this request. Because a malicious party does not have access to the private keys of the requesting entity, the malicious party will not be able to produce the cryptographically signed version of the token, resulting in immediate detection and denial of access. Additional details and examples are provided below.

FIG. 1 is a block diagram of an example of an environment including a system for device linked session, according to an embodiment. The server 105 includes processing circuitry 110 and memory, such as state memory 115 or storage 120. In the following examples, the processing circuitry 110 is configured, perhaps in whole or part by instructions in the memory, to perform device linked session authentication.

The user 135 is using a computer 125 to run a web browser 130 to authenticate to the server 105. The computer connects to the server 105 via a gateway that enable the threat actor 155 to access an unencrypted version of communications between the computer 125 and the server 105. Here, the unencrypted version generally means that the underlying communications protocol is no longer encrypted and, for example, that the HTTP headers are unencrypted. There is a second threat actor 160 that has access to logs (e.g., in the storage 120) on the server 105, and thus can acquire unencrypted HTTP header data.

The processing circuitry 110 is configured to receive a request for a session token, for example, from the computer 125. Here, the session token refers to a token that is limited in time or uses (e.g., the token is valid for fifty requests). The period of validity is the session. It is possible for the token to be invalidated by the server 105 due to an event, such as a notification that an attempt to access an account of the user 135 is underway. In this case, the session is terminated when the token is invalidated.

Contrary to typical token requests, the request for the session token includes an identification of the entity making the request. Here, entity refers to the hardware or software that is making the request. In an example, the entity is a device, such as the computer 125 or the phone 140. In an example, where the entity is a device, the identification of the entity is managed by a hardware cryptographic component of the device. The phone 140 illustrates this example. Here, the phone 140 includes a processor 145 and a hardware cryptography component 150. In some cases, the hardware cryptography component 150 can be included in the processor 145 as a discrete block, such as a Trusted Platform Module (TPM) or the like. In any case, the hardware cryptography component 150 is configured to provide secure storage of sensitive information, such as a private key. This secure storage generally limits which components, and under which circumstances the secure data held by the hardware cryptography component 150 can be accessed. In an example, the hardware cryptography component 150 also provides a secure execution environment, such as a trusted execution environment (TEE), in which the execution (e.g., including memory used during execution) is secured from observation by unauthorized components or processes.

In an example, the entity an application, such as the browser 130. In these cases, the management of the entity identity is managed in software. Whichever component manages the identifier of the entity effectively limits the validity of the session token. Thus, if the computer 125 has two browsers, then each browser would be a separate and distinct entity to the server 105, much like the computer 125 is a separate and distinct entity to the phone 140.

In an example, the identification of the entity is a public key that corresponds to a private key of the entity. The use of public key cryptography, in which the entity maintains a secret private key that is paired with a public key that can be shared can take advantage of current infrastructure and support for digital signatures. Here, the private key is used to encrypt, a piece of data and the public key is shared with a recipient. The public key can be used to decrypt the encrypted data and verify that the entity that performed the encryption is in possession of the private key that corresponds to the public key.

In an example, the identification is a serial number, Universal Unique Identifier (UUID), random value, or other value that is likely unique to the entity. Here, likely unique means that, while possible for two entities to have the same identification, the likelihood is so low that the value can be treated as unique, as is the case with UUIDs. The intent here is to tie this value to the session token request and subsequent requests using the session token so that the entity can be verified along with the validity of the session token.

Once the session token request is received, the processing circuitry 110 is configured to record—for example in the state memory 115 or the storage 120—the identification of the entity from the request. As noted earlier, this identification will, in part, form a second validation of the entity along with the session token validation for future requests by the entity.

In an example, recording the identification of the entity includes determining that the entity has not previously been registered. In this example, an entity registration processes, as opposed to simply recording the identification along with a new session token, occurs. The registration can include the processing circuitry 110 registering the entity in an entry in a datastore and creating a security tag based on the entry in a datastore. This security tag can include a public-private and including the security tag in the response to the request. In an example, the public key of the entity, whether supplied by the entity or provided by the server 105, is stored in the entry in the datastore. Where the identification includes the public key of the entity, the registration can reuse the stored public key on subsequent session token requests.

The processing circuitry 110 is configured to a response to the request, this response including the session token. The response concludes the issues of the session token to the entity. Now, the entity can use the session token instead of reauthenticating in order to access restricted resources, such as websites, cloud endpoints, etc. To do this, the entity includes the session token with each subsequent request during the session. In the context of HTTP communications, the session token is usually included in the HTTP header of each subsequent request.

The processing circuitry 110 is configured to receive a data request. Here, the entity includes both the session token and a cryptographically signed version of the session token in the request. The session token will be used by the processing circuitry 110 to validate the session as is typical in stateless access control using tokens. The processing circuitry 110 is also configured to determine that the cryptographically signed version of the session token originated from the entity using the identification of the entity. For example, if the identification of the entity is a public key, that public key is used to decrypt the cryptographically signed session token to match the decrypted version with the plaintext version. If they match, the server 105 has determined that both originated from the same entity that originally requested the session token. In an example, where the recording of the entity identification includes storing a key-pair, a public component of the key-pair is used by the entity to create the cryptographically signed version of the session token.

There can arise a situation in which a threat actor 155 gets ahold of both the session token and the cryptographically signed version of the session token. If the cryptographically signed version of the session token does not change regularly, such as with each request, the threat actor 155 could simply provide the copies to execute code with the same authority as the user 135. To address this issue, a freshness value can be used. A freshness value is a value that regularly changes and is incorporated into the cryptographically signed version of the session token. Thus, in an example, the cryptographically signed version of the session token is created with the freshness value. In an example, the freshness value is a monotonically increasing counter. Here, a counter is increased by the entity and usually by the processing circuitry 110, for each exchange. Because the value of the monotonic counter is incremented (or decremented) in one direction, the value does not repeat. The step can be regular, such as increasing the count by one or five each time, or irregular, such as a random step increase between one and fifty between each request. In an example, the freshness value is a current time. Time has the advantage of being monotonic and widely available and the step varies with the requesting behavior of the entity. Further, time can be used by the processing circuitry 110 to determine appropriate request patterns to help identify attempts by a threat actor to exploit a session token.

After the processing circuitry 110 has successfully validated both the session token and the cryptographically signed version of the session token, the processing circuitry is configured to communicate approval of the data request. This communication can include releasing the resource identified in the data request or notifying another device to do so. In general, once the successful validation of both the session token and the cryptographically signed version of the session token has been made, and the approval communicated, the processing circuitry 110 has successfully implemented a device linked session.

The processing circuitry 110 can be configured to perform additional checks to ensure that a threat actor cannot successfully use a valid session token. In an example, the processing circuitry 110 is configured to communicate the approval of the data request based on conformance within defined tolerances of a behavior profile. This example uses a behavior profile for the user 135 or the computer 125 (e.g., or other device) as a reference for appropriate request behavior of the current request. The behavior profile is based on past actions of the user 135 or the entity and can be include statistical values for such things as response times, time to enter manual data (e.g., a password), or types of resources being requested. In examples, where the behavior profile corresponds to the user 135, the request for the session token can include authentication information for the user 135. An example behavior profile example can include tracking device operating system. If the operating system goes backward in versioning, a violation can be inferred because it is unusual for a user to degrade an operating system.

A variety of other additional checks can be performed. For example, more frequent, or more rigorous authentication can be required under predefined circumstances, such as when a user is in a country or area with a greater prevalence of digital crime. Greater levels of authentication can include multi-factor authentication. Generally, risk level variations can be based on physical location, activity "what is the user attempting to do?"—this can include such things as international monetary transfer being riskier than checking account notifications—and who the user is (e.g., what is the user's profession, what responsibilities and powers does the user have, etc. Generally, the more important the user or the activity, the more the frequency or severity of authentication is increased. In an example, aspects of these risk profiles can be gathered by the entity and transmitted to the server 105.

Figure 2:
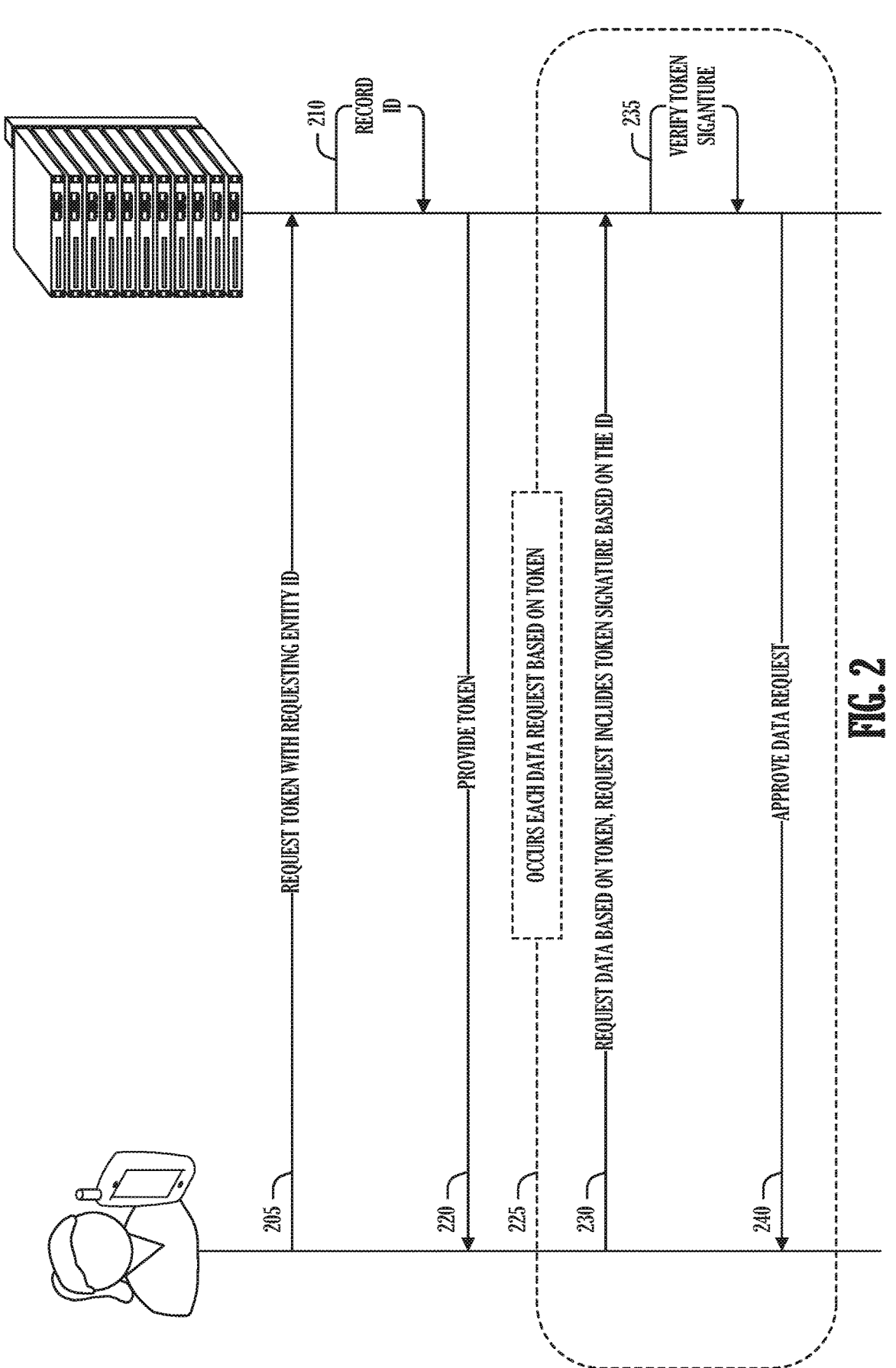
FIG. 2 illustrates an example of communications using a device linked session, according to an embodiment.

FIG. 2 illustrates an example of communications using a device linked session, according to an embodiment. The illustrated signals follow an interaction between an entity (a mobile phone) and an authenticator. The exchange begins with the entity requesting a token (communication 205).

Generally, such a request includes, or is part of, an authentication exchange in which the entity provides credentials to access a resource. Here, the entity provides an ID, either as part of the authentication exchange, in addition to an authentication exchange, or in a standalone request. As noted above, the ID can be a public key for the entity or an identifier of the entity that is distinguishable from identifiers used by other entities connecting to the authenticator.

The authenticator records the ID of the entity locally (operation 210). The recordation enables the authenticator to refer to the ID in future communications to verify that the same entity that requested the token is using the token. The authenticator provides the token—usually after a successful authentication by the entity—to the entity (communication 220). In examples where the authenticator provides a mechanism by which the token will be signed in future exchanges, the instruments of the mechanism can be included in this communication. Thus, for example, if the authenticator generates a key-pair for the entity and this session, the key-pair can be communicated along with the token to the entity.

Once the entity has the toke, the entity includes the token during future requests to access resources based on the credentials (phase 225). For each such request, the entity makes the request and includes both the token as well as a secured version of the token (communication 230). Here, the secured version of the token is a manipulation to the token that is performed in such a way that it is impossible, or practically impossible, for another entity to perform the manipulation. Typically, a cryptographic signature meets this criterion. Thus, the entity can use a private key to encrypt the token to create the secured version of the token. As noted above, a freshness value (e.g., monotonic counter, time, etc.) can be added to the encrypted package to produce a different version of the token for each request by the entity. This can help to prevent so called "replay" attacks.

When the authenticator receives the token and the secured version of the token, the validity of both are verified (operation 235). Typically, the token verification involves a lookup of the provided token to determine whether such a token was issued and whether the token is still valid. Other checks may include matching the token to the requested resource to determine whether the originally provided credentials grant the entity access to that resource.

The validity determination for the secured version of the token generally involves using the entity ID to get access to the token from the secured version. Thus, if the ID is a public key, the authenticator can decrypt the secured version of the token to get the token and then match that payload with the token provided in plaintext. If the two match, then the validation is successful.

When both the plaintext version of the token and the secured version of the token are validated, the authenticator provides an indication that the request is authorized (communication 240). Often the authenticator will not be responsible for satisfy the request. In these examples, the communication 240 is provided to the entity that will satisfy the request. However, the illustrated exchange is simpler and involves the authenticator actually fulfilling the request in the communication 240.

Figure 3:
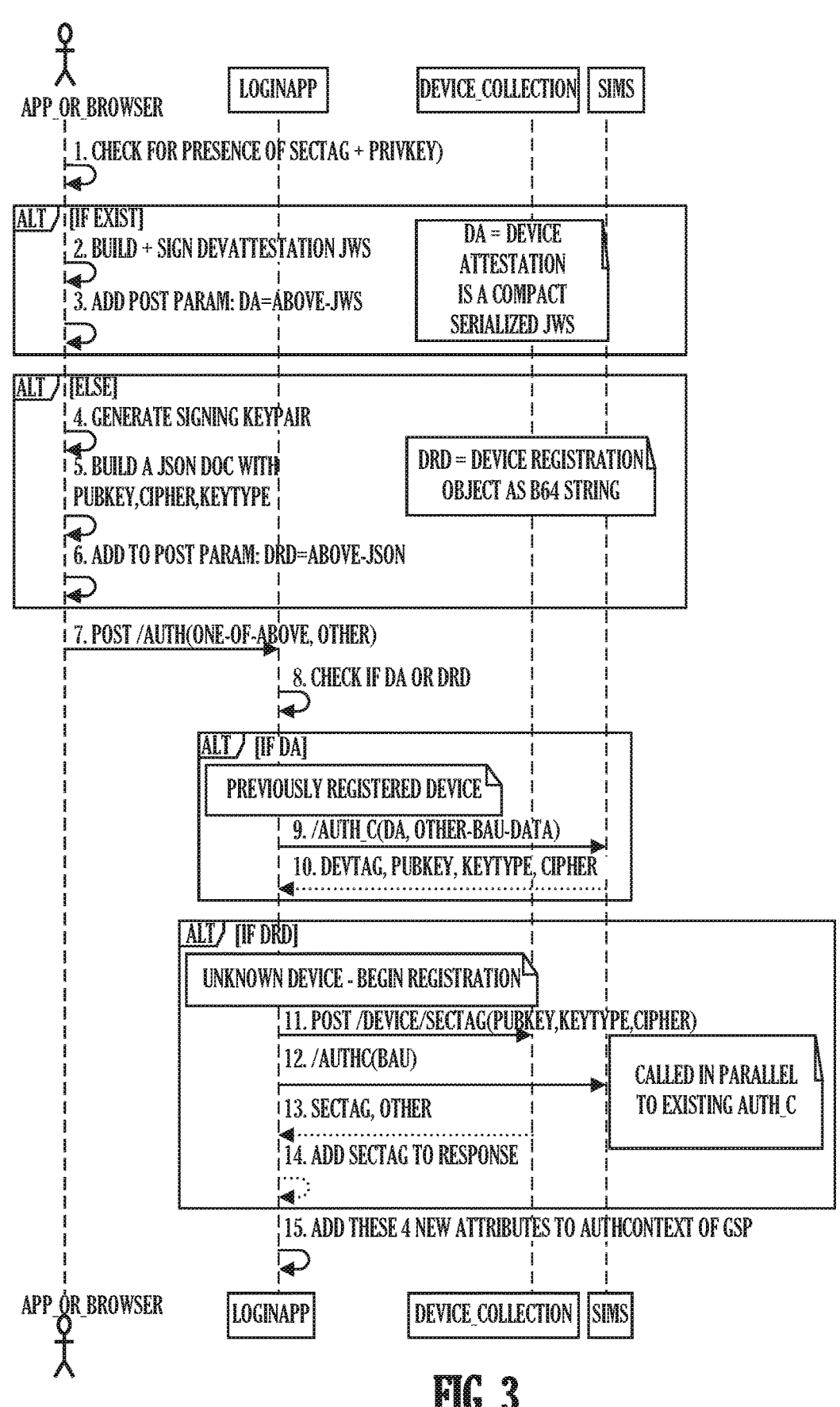
FIG. 3 illustrates an example of communications to recognize or register a device, according to an embodiment.

FIG. 3 illustrates an example of communications to recognize or register a device, according to an embodiment. FIG. 2 illustrated both the token acquisition and the use of the token and a secure token in additional communications. FIG. 3 focuses on an implementation of the token acquisition using present web technologies, such as JavaScript Object Notation (JSON) Web Tokens (JWT) and JSON Web Signatures (JWS). The illustrated interaction included an entity—an application such as a web browser or a device—on the left interacting with a login application. The login application interactions with a service that tracks entities (e.g., the device collection) and a Security Information Management System (SIMS). The interactions are performed using HTTP requests.

For clarity, the operations and communications are serially numbered.

1. The entity determines whether or not it has previously been registered by checking for a security tag and private key. In this implementation, the security tag is additional information provided by the login application to the entity.

2. If the entity has been previously registered, the entity creates and uses a JWS attestation—signifying that the entity is what the entity represents that it is—to identify itself to the login application.

3. After 2, the entity provides the JWS as a parameter to HTTP POST requests.

4. If the entity has not already been registered, the entity creates a key-pair that it will use in the future.

5. The entity then creates a JSON registration object that includes the public key from the key-pair, what encryption will be used (e.g., the cipher), and the type of key being used.

6. The entity uses the registration object as a parameter in HTTP POST requests.

7. The entity makes an HTTP POST request to authenticate. This POST request includes a parameter that is either the attestation object from 2-3 or the registration object from 4-6 depending on the initial state of the entity from 1.

8. The login application checks to determine whether the entity has already been registered or not.

9. If the entity has been registered—e.g., the POST parameter is a device attestation-then the authentication is sent to the SIMS.

10. If the authentication passes, the SIMS provides the entity information to the login application so that the login application can interact with the entity in a device linked session.

11. If the device is not registered, the registration parameters from the entity are communicated to the device collection service.

12. The authentication information is also transmitted (serially or in parallel to 11) to the SIMS.

13. The device collection service provides a security tag to the login application.

14. The login application includes the security tag to the next response to the entity.

15. The login application also adds the entity attributes for authentication (e.g., the cipher, key, etc.) to the authentication context for future interactions. As illustrated, GSP stands for Global State Provider, which provides state storage implementation on server.

Figure 4:
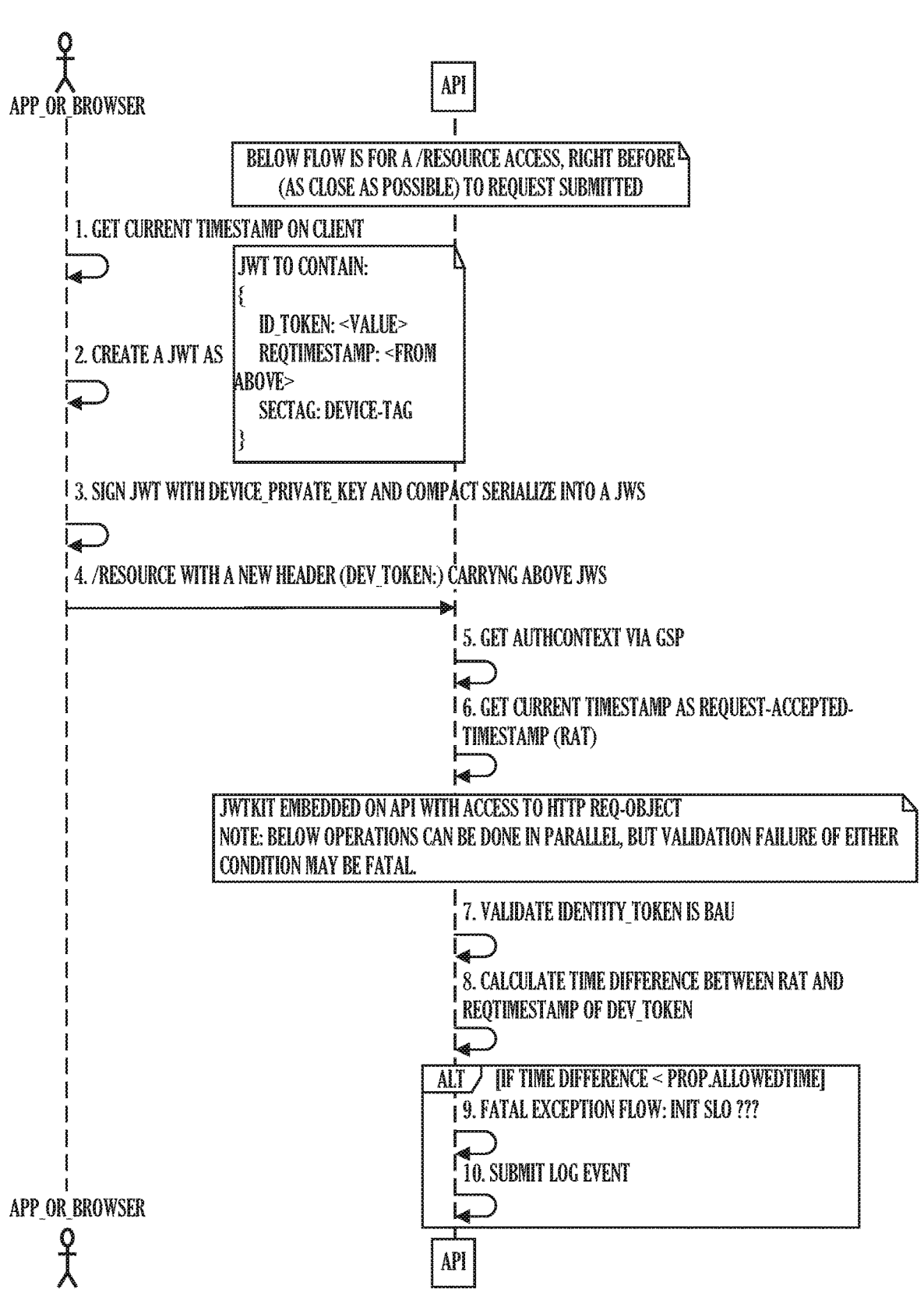
FIG. 4 illustrates an example of communications using a signed session token, according to an embodiment.

FIG. 4 illustrates an example of communications using a signed session token, according to an embodiment. Like the implementation described above with respect to FIG. 3, FIG. 4 illustrates exchanges using current web technologies and uses serially numbered operations. Here, the entity is interaction with an authentication application programming interface (XAPI) and a current time is used as a freshness value for exchanges.

1. The entity gets the current time.

2. The entity creates a JWT attestation object that includes the toke, the time, and a security tag (e.g., as described with respect to FIG. 3).

3. The entity then cryptographically signs the JWT using a private key of the entity that corresponds to a public key provided by the entity during device registration (e.g., as described above with respect to FIG. 3). In an example, the entity transforms the JWT into a JWS.

4. The entity includes the signed token in an HTTP header requesting a resource. In this instance, the token and the cryptographically signed version of the token are the same.

5. The API machine retrieves the authentication context for the entity.

6. The API machine also retrieves the current time.

7. The API machine validates that the discrete time stamp token (Identity Token) is a Basic Authentication User (BAU) token.

8. The API machine checks the difference in the time from 6 and the time from 1 included in the token.

9. When the difference in times calculated in 8 is beyond a predetermined threshold of validity—that is the time in the token from the entity is too old—then the API machine denies the access.

10. The denial of access is then logged by the API machine.

FIG. 5 illustrates a flow diagram of an example of a method 500 for device linked session, according to an embodiment. The operations of the method 500 are performed by computational hardware, such as that described above or below (e.g., processing circuitry).

At operation 505, receiving a request for a session token, the request including an identification of an entity making the request. In an example, the identification of the entity is a public key that corresponds to a private key of the entity. In an example, the entity an application. In an example, the entity is a device. In an example, where the entity is a device, the identification of the entity is managed by a hardware cryptographic component of the device.

At operation 510, recording the identification of the entity from the request. In an example, recording the identification of the entity includes determining that the entity has not previously been registered, registering the entity in an entry in a datastore, creating a security tag based on the entry in a datastore, and including the security tag in the response to the request. In an example, a public key of the entity is stored in the entry in the datastore. In an example, the security tag includes a key-pair for the entity.

At operation 515, communicating a response to the request, the response including the session token.

At operation 520, receiving a data request, the data request including:

the session token; and a cryptographically signed version of the session token.

At operation 525, determining that the session token from the data request is valid.

At operation 530, determining that the cryptographically signed version of the session token originated from the entity using the identification of the entity. In an example, where the recording of the entity identification includes storing a key-pair, a public component of the key-pair is used by the entity to create the cryptographically signed version of the session token. In an example, the cryptographically signed version of the session token is created with a freshness value. In an example, the freshness value is a monotonically increasing counter. In an example, the freshness value is a current time.

At operation 535, communicating approval of the data request based on the session token being valid and the cryptographically signed version of the session token originating from the entity. In an example, communicating the approval of the data request is based on conformance within defined tolerances of a behavior profile. In an example, the behavior profile corresponds to a user. In this example, the request for the session token includes authentication information for the user. In an example, the behavior profile corresponds to the entity. In an example, the behavior profile is based on a recorded history of behavior.

Figure 6:
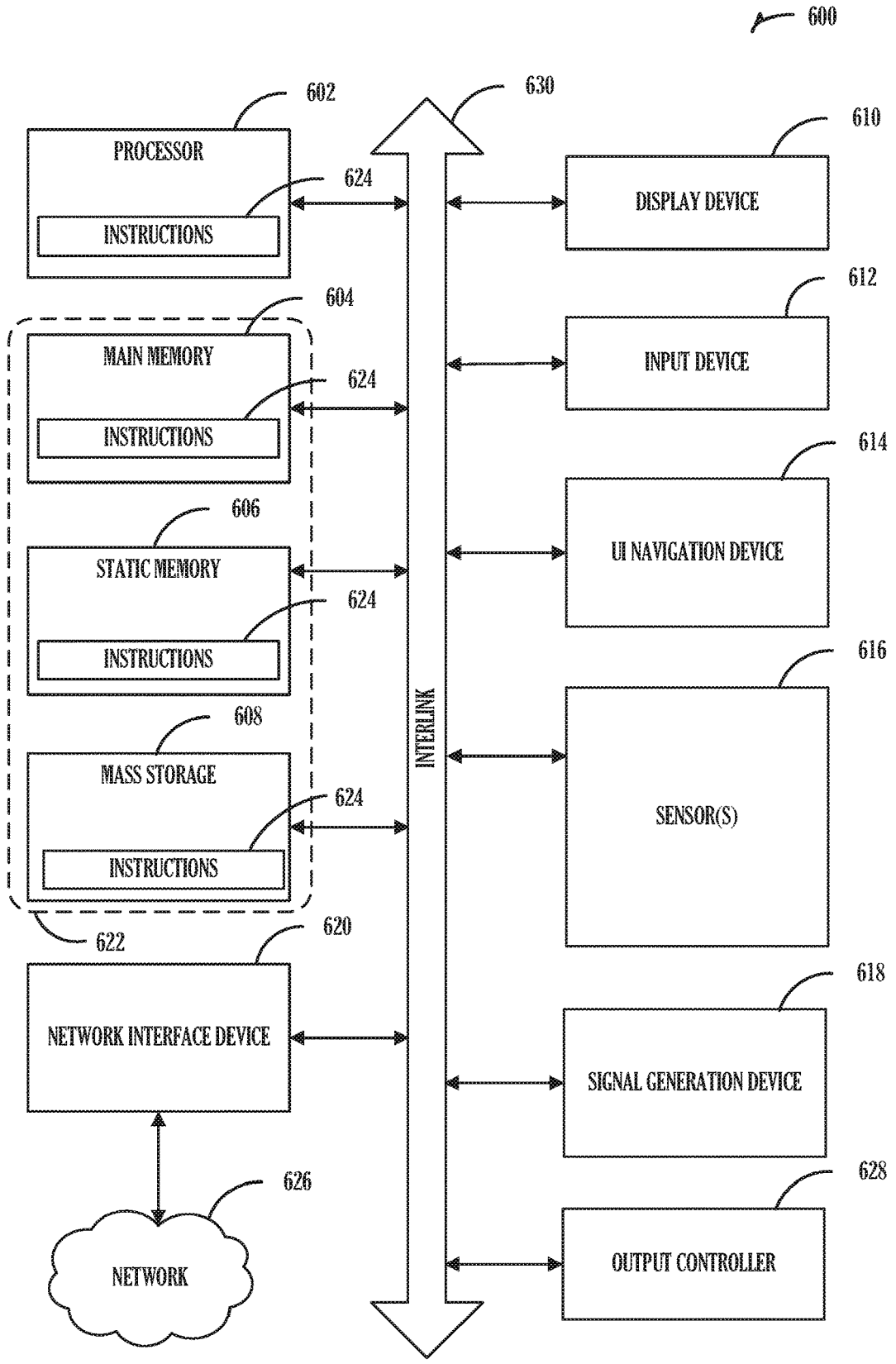
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 622 may be representative of the instructions 624, such as instructions 624 themselves or a format from which the instructions 624 may be derived. This format from which the instructions 624 may be derived may include source code, encoded instructions (e.g., in compressed or encrypted form), packaged instructions (e.g., split into multiple packages), or the like. The information representative of the instructions 624 in the machine readable medium 622 may be processed by processing circuitry into the instructions to implement any of the operations discussed herein. For example, deriving the instructions 624 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 may include assembly, compilation, or interpretation of the information (e.g., by the processing circuitry) to create the instructions 624 from some intermediate or preprocessed format provided by the machine readable medium 622. The information, when provided in multiple parts, may be combined, unpacked, and modified to create the instructions 624. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

ADDITIONAL NOTES & EXAMPLES

Example 1 is a device comprising: a network interface configured to communicate over a network; a storage configured to store data; and processing circuitry configured to: receive, via the network interface, a request for a session token, the request including an identification of an entity making the request; record, in the storage, the identification of the entity from the request; communicate, via the network interface, a response to the request, the response including the session token; receive, via the network interface, a data request, the data request including: the session token; a cryptographically signed version of the session token; determine that the session token from the data request is valid; determine that the cryptographically signed version of the session token originated from the entity using the identification of the entity; and communicate approval of the data request based on the session token being valid and the cryptographically signed version of the session token originating from the entity.

In Example 2, the subject matter of Example 1, wherein the identification of the entity is a public key that corresponds to a private key of the entity.

In Example 3, the subject matter of any of Examples 1-2, wherein the entity is at least one of an application or a device.

In Example 4, the subject matter of Example 3, wherein the entity is a device, and wherein the identification of the entity is managed by a hardware cryptographic component of the device.

In Example 5, the subject matter of any of Examples 1-4, wherein the processing circuitry configured to record the identification of the entity is further configured to: determine that the entity has not previously been registered; register the entity in an entry in the storage; create a security tag based on the entry in the storage; and include the security tag in the response to the request communicated via the network interface.

In Example 6, the subject matter of Example 5, wherein a public key of the entity is stored in the entry in the storage.

In Example 7, the subject matter of any of Examples 5-6, wherein the security tag includes a key-pair for the entity, and wherein a public component of the key-pair is used by the entity to create the cryptographically signed version of the session token.

In Example 8, the subject matter of any of Examples 1-7, wherein the processing circuitry configured to communicate the approval of the data request is further configured to communicate the approval based on conformance within defined tolerances of a behavior profile.

In Example 9, the subject matter of Example 8, wherein the behavior profile corresponds to a user, the request for the session token including authentication information for the user.

In Example 10, the subject matter of any of Examples 8-9, wherein the behavior profile corresponds to the entity.

In Example 11, the subject matter of any of Examples 8-10, wherein the behavior profile is based on a recorded history of behavior stored in the storage.

In Example 12, the subject matter of any of Examples 1-11, wherein the cryptographically signed version of the session token is created with a freshness value.

In Example 13, the subject matter of Example 12, wherein the freshness value is a monotonically increasing counter.

In Example 14, the subject matter of Example 13, wherein the freshness value is a current time.

Example 15 is a method for a device linked session, the method comprising: receiving a request for a session token, the request including an identification of an entity making the request; recording the identification of the entity from the request; communicating a response to the request, the response including the session token; receiving a data request, the data request including: the session token; and a cryptographically signed version of the session token; determining that the session token from the data request is valid; determining that the cryptographically signed version of the session token originated from the entity using the identification of the entity; and communicating approval of the data request based on the session token being valid and the cryptographically signed version of the session token originating from the entity.

In Example 16, the subject matter of Example 15, wherein the identification of the entity is a public key that corresponds to a private key of the entity.

In Example 17, the subject matter of any of Examples 15-16, wherein the entity is at least one of an application or a device.

In Example 18, the subject matter of Example 17, wherein the entity is a device, and wherein the identification of the entity is managed by a hardware cryptographic component of the device.

In Example 19, the subject matter of any of Examples 15-18, wherein recording the identification of the entity includes: determining that the entity has not previously been registered; registering the entity in an entry in a datastore; creating a security tag based on the entry in a datastore; and including the security tag in the response to the request.

In Example 20, the subject matter of Example 19, wherein a public key of the entity is stored in the entry in the datastore.

In Example 21, the subject matter of any of Examples 19-20, wherein the security tag includes a key-pair for the entity, and wherein a public component of the key-pair is used by the entity to create the cryptographically signed version of the session token.

In Example 22, the subject matter of any of Examples 15-21, wherein communicating the approval of the data request is based on conformance within defined tolerances of a behavior profile.

In Example 23, the subject matter of Example 22, wherein the behavior profile corresponds to a user, the request for the session token including authentication information for the user.

In Example 24, the subject matter of any of Examples 22-23, wherein the behavior profile corresponds to the entity.

In Example 25, the subject matter of any of Examples 22-24, wherein the behavior profile is based on a recorded history of behavior.

In Example 26, the subject matter of any of Examples 15-25, wherein the cryptographically signed version of the session token is created with a freshness value.

In Example 27, the subject matter of Example 26, wherein the freshness value is a monotonically increasing counter.

In Example 28, the subject matter of Example 27, wherein the freshness value is a current time.

Example 29 is a non-transitory computer readable medium including instructions that, when executed by processing circuitry, cause the processing circuitry to perform operations comprising: receiving a request for a session token, the request including an identification of an entity making the request; recording the identification of the entity from the request; communicating a response to the request, the response including the session token; receiving a data request, the data request including: the session token; and a cryptographically signed version of the session token; determining that the session token from the data request is valid; determining that the cryptographically signed version of the session token originated from the entity using the identification of the entity; and communicating approval of the data request based on the session token being valid and the cryptographically signed version of the session token originating from the entity.

In Example 30, the subject matter of Example 29, wherein the identification of the entity is a public key that corresponds to a private key of the entity.

In Example 31, the subject matter of any of Examples 29-30, wherein the entity is at least one of an application or a device.

In Example 32, the subject matter of Example 31, wherein the entity is a device, and wherein the identification of the entity is managed by a hardware cryptographic component of the device.

In Example 33, the subject matter of any of Examples 29-32, wherein recording the identification of the entity includes: determining that the entity has not previously been registered; registering the entity in an entry in a datastore; creating a security tag based on the entry in a datastore; and including the security tag in the response to the request.

In Example 34, the subject matter of Example 33, wherein a public key of the entity is stored in the entry in the datastore.

In Example 35, the subject matter of any of Examples 33-34, wherein the security tag includes a key-pair for the entity, and wherein a public component of the key-pair is used by the entity to create the cryptographically signed version of the session token.

In Example 36, the subject matter of any of Examples 29-35, wherein communicating the approval of the data request is based on conformance within defined tolerances of a behavior profile.

In Example 37, the subject matter of Example 36, wherein the behavior profile corresponds to a user, the request for the session token including authentication information for the user.

In Example 38, the subject matter of any of Examples 36-37, wherein the behavior profile corresponds to the entity.

In Example 39, the subject matter of any of Examples 36-38, wherein the behavior profile is based on a recorded history of behavior.

In Example 40, the subject matter of any of Examples 29-39, wherein the cryptographically signed version of the session token is created with a freshness value.

In Example 41, the subject matter of Example 40, wherein the freshness value is a monotonically increasing counter.

In Example 42, the subject matter of Example 41, wherein the freshness value is a current time.

Example 43 is a system for a linked session, the system comprising: means for receiving a request for a session token, the request including an identification of an entity making the request; means for recording the identification of the entity from the request; means for communicating a response to the request, the response including the session token; means for receiving a data request, the data request including: the session token; and a cryptographically signed version of the session token; means for determining that the session token from the data request is valid; means for determining that the cryptographically signed version of the session token originated from the entity using the identification of the entity; and means for communicating approval of the data request based on the session token being valid and the cryptographically signed version of the session token originating from the entity.

In Example 44, the subject matter of Example 43, wherein the identification of the entity is a public key that corresponds to a private key of the entity.

In Example 45, the subject matter of any of Examples 43-44, wherein the entity is at least one of an application or a device.

In Example 46, the subject matter of Example 45, wherein the entity is a device, and wherein the identification of the entity is managed by a hardware cryptographic component of the device.

In Example 47, the subject matter of any of Examples 43-46, wherein the means for recording the identification of the entity includes: means for determining that the entity has not previously been registered; means for registering the entity in an entry in a datastore; means for creating a security tag based on the entry in the datastore; and means for including the security tag in the response to the request.

In Example 48, the subject matter of Example 47, wherein a public key of the entity is stored in the entry in the datastore.

In Example 49, the subject matter of any of Examples 47-48, wherein the security tag includes a key-pair for the entity, and wherein a public component of the key-pair is used by the entity to create the cryptographically signed version of the session token.

In Example 50, the subject matter of any of Examples 43-49, wherein the means for communicating the approval of the data request is based on conformance within defined tolerances of a behavior profile.

In Example 51, the subject matter of Example 50, wherein the behavior profile corresponds to a user, the request for the session token including authentication information for the user.

In Example 52, the subject matter of any of Examples 50-51, wherein the behavior profile corresponds to the entity.

In Example 53, the subject matter of any of Examples 50-52, wherein the behavior profile is based on a recorded history of behavior.

In Example 54, the subject matter of any of Examples 43-53, wherein the cryptographically signed version of the session token is created with a freshness value.

In Example 55, the subject matter of Example 54, wherein the freshness value is a monotonically increasing counter.

In Example 56, the subject matter of Example 55, wherein the freshness value is a current time.

PNUM Example 57 is at least one machine-readable medium including instructions that, when executed by processing circuitry, cause the processing circuitry to perform operations to implement of any of Examples 1-56.

PNUM Example 58 is an apparatus comprising means to implement of any of Examples 1-56.

PNUM Example 59 is a system to implement of any of Examples 1-56.

PNUM Example 60 is a method to implement of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A non-transitory computer readable medium including instructions that, when executed by processing circuitry, cause the processing circuitry to perform operations comprising:

receiving a request for a session token for a user, the request including an identification of an entity making the request, wherein the entity is at least one of an application or a device;

recording the identification of the entity from the request;

communicating a response to the request, the response
including the session token;

receiving a data request, the data request including:

the session token; and a cryptographically signed version of the session token;

determining that the session token from the data request
is valid;

determining that the cryptographically signed version of
the session token originated from the entity using the
identification of the entity; and communicating approval of the data request based on the
session token being valid and the cryptographically
signed version of the session token originating from the
entity, wherein recording the identification of the entity
includes:

determining that the entity has not previously been
registered;

registering the entity in an entry in a datastore;

creating a security tag based on the entry in a datastore,
wherein the security tag includes a key-pair for the
entity, and wherein a public component of the key-
pair is used by the entity to create the cryptographi-
cally signed version of the session token; and including the security tag in the response to the request.

2. The non-transitory computer readable medium of claim
1, wherein the identification of the entity is a public key that
corresponds to a private key of the entity.

3. The non-transitory computer readable medium of claim
1, wherein the entity is a device, and wherein the identifi-
cation of the entity is managed by a hardware cryptographic
component of the device.

4. The non-transitory computer readable medium of claim
1, wherein a public key of the entity is stored in the entry in
the datastore.

5. The non-transitory computer readable medium of claim
1, wherein communicating the approval of the data request
is based on conformance within defined tolerances of a
behavior profile.

6. The non-transitory computer readable medium of claim
5, wherein the behavior profile corresponds to a user, the
request for the session token including authentication infor-
mation for the user.

7. The non-transitory computer readable medium of claim
5, wherein the behavior profile corresponds to the entity.

8. The non-transitory computer readable medium of claim
5, wherein the behavior profile is based on a recorded history
of behavior.

9. A method for a device linked session, the method
comprising:

receiving a request for a session token for a user, the
request including an identification of an entity making
the request, wherein the entity is at least one of an
application or a device;

recording the identification of the entity from the request;

communicating a response to the request, the response
including the session token;

receiving a data request, the data request including:

the session token; and a cryptographically signed version of the session token;

determining that the session token from the data request
is valid;

determining that the cryptographically signed version of
the session token originated from the entity using the
identification of the entity; and communicating approval of the data request based on the
session token being valid and the cryptographically
signed version of the session token originating from the
entity, wherein recording the identification of the entity
includes:

determining that the entity has not previously been
registered;

registering the entity in an entry in a datastore;

creating a security tag based on the entry in a datastore,
wherein the security tag includes a key-pair for the
entity, and wherein a public component of the key-
pair is used by the entity to create the cryptographi-
cally signed version of the session token; and including the security tag in the response to the request.

10. The method of claim 9, wherein the identification of
the entity is a public key that corresponds to a private key of
the entity.

11. The method of claim 9, wherein the entity is a device,
and wherein the identification of the entity is managed by a
hardware cryptographic component of the device.

12. The method of claim 9, wherein a public key of the
entity is stored in the entry in the datastore.

13. The method of claim 9, wherein communicating the
approval of the data request is based on conformance within
defined tolerances of a behavior profile.

14. The method of claim 13, wherein the behavior profile
corresponds to a user, the request for the session token
including authentication information for the user.

15. The method of claim 13, wherein the behavior profile
corresponds to the entity.

16. The method of claim 13, wherein the behavior profile
is based on a recorded history of behavior.

* * * * *